US009882866B2

(12) United States Patent
Zou et al.

(10) Patent No.: US 9,882,866 B2
(45) Date of Patent: Jan. 30, 2018

(54) ADDRESS ALLOCATING METHOD, APPARATUS, AND SYSTEM

(71) Applicant: HUAWEI TECHNOLOGIES CO., LTD., Shenzhen, Guangdong (CN)

(72) Inventors: Yongjun Zou, Shenzhen (CN); Qi Zheng, Shanghai (CN); Yini Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 359 days.

(21) Appl. No.: 14/672,396

(22) Filed: Mar. 30, 2015

(65) Prior Publication Data

US 2015/0207775 A1 Jul. 23, 2015

Related U.S. Application Data

(63) Continuation of application No. PCT/CN2012/082427, filed on Sep. 29, 2012.

(51) Int. Cl.
  *H04L 12/24* (2006.01)
  *H04L 29/12* (2006.01)
(52) U.S. Cl.
  CPC ...... *H04L 61/2007* (2013.01); *H04L 41/0816* (2013.01); *H04L 61/1511* (2013.01);
  (Continued)
(58) Field of Classification Search
  CPC . H04L 61/2007; H04L 61/1511; H04L 61/251
  See application file for complete search history.

(56) References Cited

U.S. PATENT DOCUMENTS 8,966,050 B2 * 2/2015 Wu ..................... H04L 67/1002
  709/223
2004/0162909 A1 * 8/2004 Choe ................. H04L 29/12066
  709/230

(Continued)

FOREIGN PATENT DOCUMENTS

| CN | 1523849 | 8/2004 |
| CN | 1547722 | 11/2004 |

(Continued)

OTHER PUBLICATIONS

"DNS64 Resolvers and Dual-Stack Hosts draft-wing-behave-dns64-config-00"—D. Wing, Cisco, Jul. 2010 https://tools.ietf.org/html/draft-wing-behave-dns64-config-00.*

(Continued)

*Primary Examiner* — Randy Scott
(74) *Attorney, Agent, or Firm* — Staas & Halsey LLP

(57) ABSTRACT

Embodiments of the present invention provide an address allocating method, including: configuring both a DNS server and a DNS64 server for one access point of a gateway; determining whether a terminal requesting access to a network server supports the IPv4 protocol stack; and if the terminal supports the IPv4 protocol stack, allocating the terminal a DNS address directing to the DNS server; where, the DNS server is configured to send an IPv4 address and/or an IPv6 address of the network server to the terminal, and the DNS64 server is configured to synthesize an IPv4 address of an IPv4 network server supporting the IPv4 protocol stack only into an IPv6 address and send the IPv6 address to the terminal. The embodiments of the present invention also disclose an address allocating apparatus and system. With the present invention, various defects of an NAT64 are avoided.

15 Claims, 5 Drawing Sheets

(52) U.S. Cl.
CPC ........ *H04L 61/251* (2013.01); *H04L 61/6059* (2013.01); *H04L 61/6086* (2013.01)

(56) References Cited

U.S. PATENT DOCUMENTS

| | | | |
|---|---|---|---|
| 2004/0199666 | A1 | 10/2004 | King et al. |
| 2011/0211553 | A1* | 9/2011 | Haddad ............ H04L 29/12358 370/331 |
| 2015/0074221 | A1* | 3/2015 | Kuparinen ........ H04L 29/12066 709/214 |
| 2015/0207779 | A1 | 7/2015 | Hsu |

FOREIGN PATENT DOCUMENTS

| | | |
|---|---|---|
| CN | 101931658 | 12/2010 |
| CN | 102196051 | 9/2011 |
| CN | 102340509 | 2/2012 |
| CN | 102368789 | 3/2012 |
| RU | 2424628 | 8/2007 |
| WO | WO2007022683 | 1/2007 |
| WO | 2011/135405 A1 | 11/2011 |
| WO | WO2011147264 | 12/2011 |
| WO | WO2011160587 | 12/2011 |
| WO | WO2012000456 | 1/2012 |

OTHER PUBLICATIONS

D. Wing et al., "IPv6-only and Dual Stack Hosts on the Same Network with DNS64 draft-wing-behave-dns64-config-03," BEHAVE Working Group, Feb. 14, 2011, pp. 1-14.
M. Bagnulo et al., "DNS64: DNS Extensions for Network Address Translation from IPv6 Client to IPv4 Servers," Internet Engineering Task Force (IETF), Apr. 2011, pp. 1-32.
Extended European Search Report dated Nov. 24, 2015 in corresponding European Patent Application No. 12885484.1.
Chinese Office Action and Search Report dated Sep. 1, 2014 in corresponding Chinese Patent Application No. 201280001406.0.
PCT International Search Report dated May 9, 2013 in corresponding International Patent Application No. PCT/CN2012/082427.
Wang, "NAT64 load balancing of DNS Design and Implementation of a transition condition based on IPv4IPv6", Aug. 15, 2012, pp. 1-3 (Translation) and 9-10.
International Search Report, dated May 9, 2013, in corresponding International Application No. PCT/CN2012/082427 (4 pp.).

* cited by examiner

ADDRESS ALLOCATING METHOD, APPARATUS, AND SYSTEM

CROSS-REFERENCE TO RELATED APPLICATIONS

This application is a continuation of International Application No. PCT/CN2012/082427, filed on Sep. 29, 2012, which is hereby incorporated by reference in its entirety.

TECHNICAL FIELD

Embodiments of the present invention relate to the field of mobile Internet technologies, and in particular, to an address allocating method, apparatus, and system.

BACKGROUND

In current mobile Internet architecture, internet protocol version 6 (IPv6) has advantages such as a large address space, a small routing table and high security, and therefore will gradually replace the current protocol, namely internet protocol version 4 (IPv4). However, in the current mobile Internet, there are still a great number of user equipments (UE) with IPv4 addresses and servers with IPv4 addresses. At an early stage of evolution to IPv6, there will be scenarios where a great number of dual-stack terminals (with both IPv4 and IPv6 addresses) access IPv4 network servers (providing IPv4 protocol stack services only). In such scenarios, an IPv6 and IPv4 network address translation (NAT64) technology is generally used in combination with an IPv6 and IPv4 domain name system (DNS64) to implement interworking between an IPv6 network and an IPv4 network. The DNS64 is used to synthesize an A record (IPv4 address) in a domain name system (DNS) query request to an AAAA record (IPv6 address) and then return the synthesized AAAA record to a terminal supporting the IPv6 protocol stack.

In the prior art, only one DNS server or DNS64 server is configured under one access point of a gateway. When a terminal accesses a network through an access point, one access point allocates only a fixed type of addresses to the terminal. For example, when a dual-stack terminal accesses an IPv4 network server, the process is as follows: a DNS address directing to a DNS64 server is allocated to the dual-stack terminal; an A record and an AAAA record query request is sent to obtain an A record (an IPv4 address) and an AAAA record (an IPv6 address synthesized according to the IPv4 address) of the IPv4 network server; preferably, the AAAA record is selected as a destination address and an IPv6 address of the dual-stack terminal is used as a source address to initiate an IPv6-based service request; and, according to an IPv6 and IPv4 interworking policy, the IPv6 request message is translated into an IPv4 request message by an NAT64 and then sent to the IPv4 network server. A response message path of the IPv4 network server is reverse to the request message path, where a response IPv4 message is first sent to the NAT64 and then, after being translated reversely into an IPv6 message by the NAT64, sent to the dual-stack terminal. In this way, the access is completed.

This adds to service loads of the NAT64 and increases expansion costs of an operator, and user experience will be affected due to reasons such as an increased access delay and lower access reliability. In addition, inherent defects of NAT64 are inevitable. For example, an application layer gateway (ALG) is defective, which currently supports only a few network protocols and cannot parse encrypted application layer data.

SUMMARY

The present invention provides an address allocating method, apparatus, and system, which can allocate a terminal a DNS address according to a protocol stack type supported by the terminal, so that a dual-stack terminal can always access an IPv4 network server by using the IPv4 protocol stack, thereby reducing costs of an operator, improving user experience, and avoiding various defects of an NAT64.

In a first aspect, the present invention provides an address allocating method, which may include:
configuring both a DNS server and a DNS64 server for one access point of a gateway;
determining whether a terminal requesting access to a network server supports the IPv4 protocol stack; and
if the terminal supports the IPv4 protocol stack, allocating the terminal a DNS address directing to the DNS server;
where, the DNS server is configured to send an IPv4 address and/or an IPv6 address of the network server to the terminal, and the DNS64 server is configured to synthesize an IPv4 address of an IPv4 network server supporting the IPv4 protocol stack only into an IPv6 address and send the IPv6 address to the terminal.

In a second aspect, the present invention provides an address allocating apparatus, which may include:
a transceiving unit, configured to perform information interaction with a DNS server and a DNS64 server that are both configured on one access point;
a determining unit, configured to determine whether a terminal requesting access to a network server supports the IPv4 protocol stack; and
an allocating unit, configured to, if a terminal requesting access to a network server supports the IPv4 protocol stack, allocate the terminal a DNS address directing to the DNS server;
where, the DNS server is configured to send an IPv4 address and/or an IPv6 address of the network server to the terminal, and the DNS64 server is configured to synthesize an IPv4 address of an IPv4 network server supporting the IPv4 protocol stack only into an IPv6 address and send the IPv6 address to the terminal.

In a third aspect, the present invention provides an address allocating apparatus, which may include:
a processor and a memory, where the memory is configured to store a program executed by the processor and the processor is configured to perform all steps in the forgoing method.

In a fourth aspect, the present invention provides an address allocating system, which may include:
the forgoing apparatuses;
a DNS server, configured to send an IPv4 address and/or an IPv6 address of a network server to a terminal; and
a DNS64 server, configured to synthesize an IPv4 address of an IPv4 network server supporting the IPv4 protocol stack only into an IPv6 address and send the IPv6 address to the terminal.

An implementation of the embodiments of the present invention brings the following benefits:
Configuring both a DNS server and DNS64 server on one access point of a gateway and allocating a terminal a DNS address directing to the DNS server or DNS64 server according to a protocol stack type supported by the terminal enrich allocation modes in the prior art. Moreover, a DNS address directing to the DNS server is allocated to a dual-stack terminal, so that the dual-stack terminal, when accessing an IPv4 network server, can always access the IPv4 network server directly by using the IPv4 protocol stack without the need of message translation by an NAT64, thereby reducing service loads of the NAT64 and lowering expansion costs of an operator. In addition, the access delay is decreased and access reliability is improved to avoid problems, for example, that an NAT64 supports only a few network protocols and cannot decrypt application layer data due to a defective application layer gateway.

BRIEF DESCRIPTION OF DRAWINGS

To illustrate the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
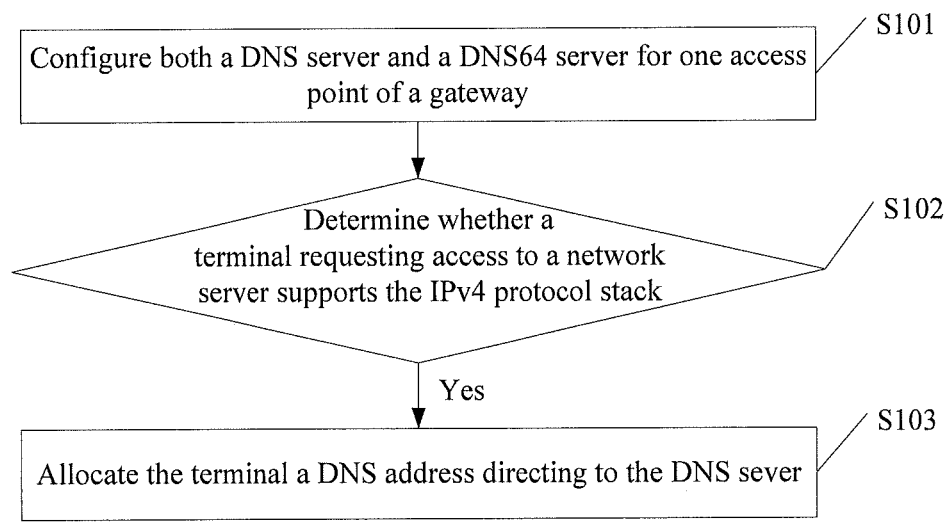
FIG. 1 is a schematic flowchart of an address allocating method according to a first embodiment of the present invention.

FIG. 1 is a schematic flowchart of an address allocating method according to a first embodiment of the present invention. In this embodiment, the method includes the following steps:

S101. Configure both a DNS server and a DNS64 server for one access point of a gateway.

This step is a basis for allocating a DNS address according to a protocol stack type supported by a terminal. The DNS server is configured to send an IPv4 address and/or an IPv6 address of a network server to the terminal, and the DNS64 server is configured to synthesize an IPv4 address of an IPv4 network server supporting the IPv4 protocol stack only into an IPv6 address and send the IPv6 address to the terminal.

S102. Determine whether a terminal requesting access to a network server supports the IPv4 protocol stack, and if yes, perform step S103.

Specifically, terminals can be divided into three types: IPv4 terminals that support the IPv4 protocol stack only, IPv6 terminals that support the IPv6 protocol stack only, and IPv4v6 terminals or dual-stack terminals that support both the IPv4 and IPv6 protocol stacks.

S103. Allocate the terminal a DNS address directing to the DNS server.

If the terminal supports the IPv4 protocol stack, the allocating the terminal a DNS address directing to the DNS server includes:

allocating a DNS address directing to the DNS server if the terminal supports the IPv4 protocol stack only; or allocating a DNS address directing to the DNS server if the terminal supports both the IPv4 and IPv6 protocol stacks.

Specifically, network servers can be divided into three types: IPv4 network servers that support the IPv4 protocol stack only, IPv6 network servers that support the IPv6 protocol stack only, and IPv4v6 network servers or dual-stack network servers that support both the IPv4 and IPv6 protocol stacks.

This embodiment involves five scenarios, namely, an IPv4 terminal accessing an IPv4 network server, an IPv4 terminal accessing a dual-stack network server, a dual-stack terminal accessing an IPv4 network server, a dual-stack terminal accessing an IPv6 server, and a dual-stack terminal accessing a dual-stack terminal server. In the first two scenarios, an IPv4 terminal may obtain an IPv4 address of an IPv4 or dual-stack network server through the DNS server and, by using the IPv4 address, access the IPv4 or dual-stack network server based on the IPv4 protocol stack. In the last two scenarios, a dual-stack terminal may obtain an IPv6 address of an IPv6 or dual-stack network server through the DNS server and, by using the IPv6 address, access the IPv6 or dual-stack network server based on the IPv6 protocol stack.

However, in the scenario where a dual-stack terminal accesses an IPv4 network server, because an address allocated to the dual-stack terminal is a DNS address of the DNS server which is incapable of synthesizing an IPv4 address of the IPv4 network server into an IPv6 address, the terminal cannot obtain a synthesized IPv6 address of the IPv4 network server but accesses the IPv4 network server based on the IPv4 protocol stack by using an IPv4 address of the IPv4 network server. Compared with the prior art, a message does not need to be translated by an NAT64, thereby reducing service loads of the NAT64 and lowering expansion costs of an operator. Moreover, the access delay is decreased and access reliability is improved to avoid various problems brought by the NAT64. For example, an application layer gateway is defective, which currently supports only a few network protocols and cannot parse encrypted application layer data.

Figure 2:
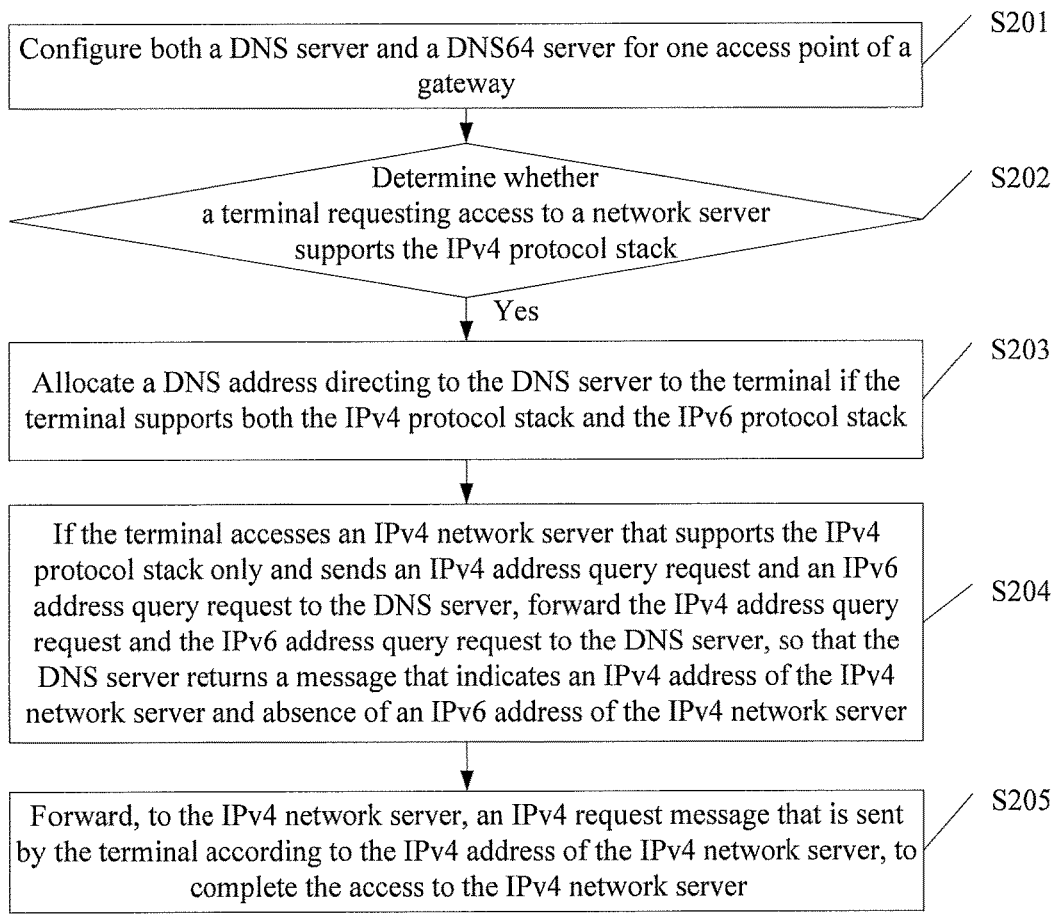
FIG. 2 is a schematic flowchart of an address allocating method according to a second embodiment of the present invention.

FIG. 2 is a schematic flowchart of an address allocating method according to a second embodiment of the present invention. In this embodiment, the method includes the following steps:

S201. Configure both a DNS server and a DNS64 server for one access point of a gateway.

S202. Determine whether a terminal requesting access to a network server supports the IPv4 protocol stack, and if yes, perform step S203.

S203. Allocate the terminal a DNS address directing to the DNS server if the terminal supports both the IPv4 protocol stack and the IPv6 protocol stack.

S204. If the terminal accesses an IPv4 network server supporting the IPv4 protocol stack only and sends an IPv4 address query request and an IPv6 address query request to the DNS server, forward the IPv4 address query request and the IPv6 address query request to the DNS server, so that the DNS server returns a message that indicates an IPv4 address of the IPv4 network server and absence of an IPv6 address of the IPv4 network server.

S205. Forward, to the IPv4 network server, an IPv4 request message that is sent by the terminal according to the IPv4 address of the IPv4 network server, to complete the access to the IPv4 network server.

Figure 3:
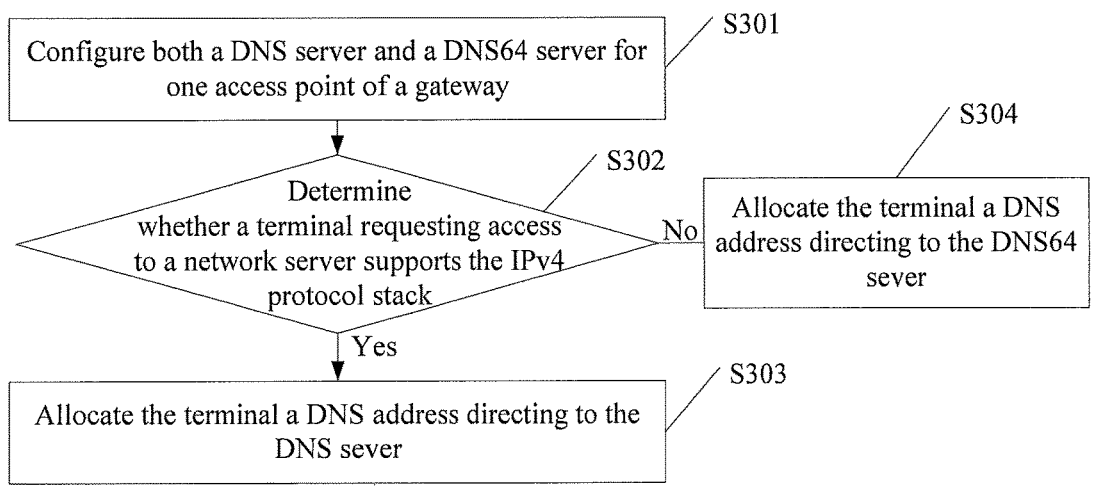
FIG. 3 is a schematic flowchart of an address allocating method according to a third embodiment of the present invention.

FIG. 3 is a schematic flowchart of an address allocating method according to a third embodiment of the present invention. In this embodiment, the method includes the following steps:

S301. Configure both a DNS server and a DNS64 server for one access point of a gateway.

S302. Determine whether a terminal requesting access to a network server supports the IPv4 protocol stack, if yes, perform step S303, and if no, perform step S304.

S303. Allocate the terminal a DNS address directing to the DNS server.

S304. Allocate the terminal a DNS address directing to the DNS64 server.

This embodiment includes all scenarios where different types of terminals in the mobile Internet access different types of network servers. Interworking between an IPv4 network and an IPv6 network is implemented by configuring both a DNS server and a DNS64 server.

Figure 4:
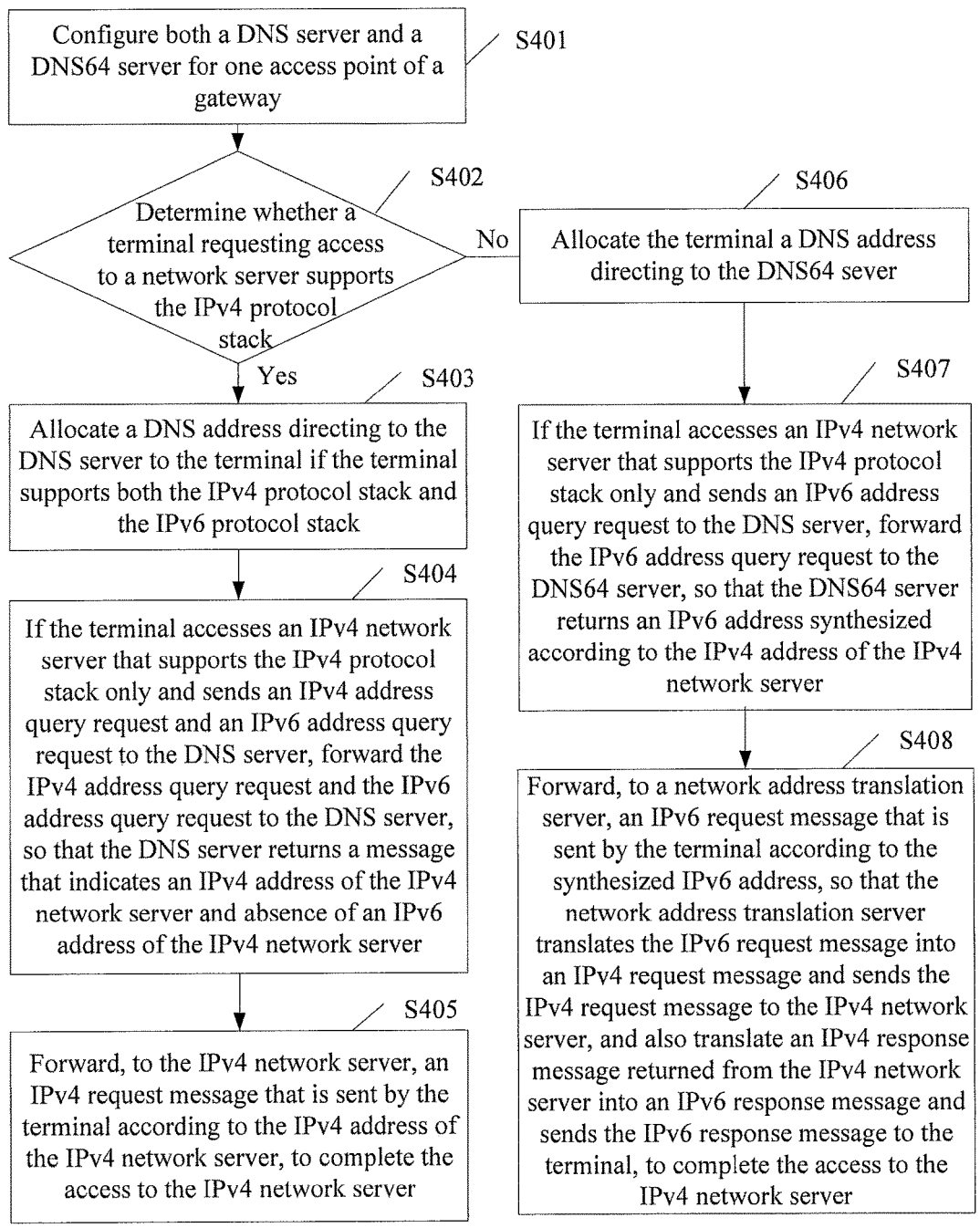
FIG. 4 is a schematic flowchart of an address allocating method according to a fourth embodiment of the present invention.

FIG. 4 is a schematic flowchart of an address allocating method according to a fourth embodiment of the present invention. The method in the embodiment includes the following steps:

S401. Configure both a DNS server and a DNS64 server for one access point of a gateway.

S402. Determine whether a terminal requesting access to a network server supports the IPv4 protocol stack, if yes, perform steps S403-S405, and if no, perform steps S406-S408.

S403. Allocate the terminal a DNS address directing to the DNS server if the terminal supports both the IPv4 protocol stack and the IPv6 protocol stack.

S404. If the terminal accesses an IPv4 network server supporting the IPv4 protocol stack only and sends an IPv4 address query request and an IPv6 address query request to the DNS server, forward the IPv4 address query request and the IPv6 address query request to the DNS server, so that the DNS server returns a message that indicates an IPv4 address of the IPv4 network server and absence of an IPv6 address of the IPv4 network server.

S405. Forward, to the IPv4 network server, an IPv4 request message that is sent by the terminal according to the IPv4 address of the IPv4 network server, to complete the access to the IPv4 network server.

S406. Allocate the terminal a DNS address directing to the DNS64 server.

S407. If the terminal accesses an IPv4 network server supporting the IPv4 protocol stack only and sends an IPv6 address query request to the DNS server, forward the IPv6 address query request to the DNS64 server, so that the DNS64 server returns an IPv6 address synthesized according to the IPv4 address of the IPv4 network server.

S408. Forward, to a network address translation server, an IPv6 request message that is sent by the terminal according to the synthesized IPv6 address, so that the network address translation server translates the IPv6 request message into an IPv4 request message and sends the IPv4 request message to the IPv4 network server, and also translates an IPv4 response message returned from the IPv4 network server into an IPv6 response message and sends the IPv6 response message to the terminal, to complete an access to the IPv4 network server.

This embodiment deals with two special cases of all scenarios where different types of terminals access different types of network servers, specifically, a dual-stack terminal accessing an IPv4 network server and an IPv6 terminal accessing an IPv4 network server. Compared with the prior art, the present invention, through flexible DNS address allocation, reduces service loads of the NAT64, lowers expansion costs of an operator, and improves access efficiency.

Figure 5:
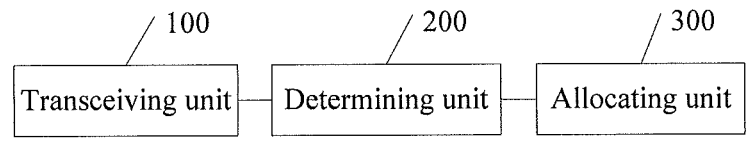
FIG. 5 is a schematic composition diagram of an address allocating apparatus according to an embodiment of the present invention.

FIG. 5 is a schematic structure diagram of an address allocating apparatus according to an embodiment of the present invention. In this embodiment, the apparatus includes a transceiving unit 100, a determining unit 200, and an allocating unit 300.

The transceiving unit 100 is configured to perform information interaction with a DNS server and a DNS64 server that are both configured on one access point.

The determining unit 200 is configured to determine whether a terminal requesting access to a network server supports the IPv4 protocol stack.

The allocating unit 300 is configured to, if the terminal accessing the network server supports the IPv4 protocol stack, allocate the terminal a DNS address directing to the DNS server.

The DNS server is configured to send an IPv4 address and/or an IPv6 address of the network server to the terminal, and the DNS64 server is configured to synthesize an IPv4 address of an IPv4 network server supporting the IPv4 protocol stack only into an IPv6 address and send the IPv6 address to the terminal.

If the terminal supports the IPv4 protocol stack, that the allocating unit 100 allocates the terminal a DNS address directing to the DNS server includes that:

the allocating unit 100 allocates the terminal a DNS address directing to the DNS server if the terminal supports the IPv4 protocol stack only; and the allocating unit 100 allocates the terminal a DNS address directing to the DNS server if the terminal supports both the IPv4 and IPv6 protocol stacks.

After a DNS address directing to the DNS server is allocated to the terminal that supports both the IPv4 protocol stack and the IPv6 protocol stack, if the terminal accesses an IPv4 network server supporting the IPv4 protocol stack only and sends an IPv4 address query request and an IPv6 address query request to the DNS server, the transceiving unit 100 is further configured to forward the IPv4 address query request and the IPv6 address query request to the DNS server, so that the DNS server returns a message that indicates an IPv4 address of the IPv4 network server and absence of an IPv6 address of the IPv4 network server; and forward, to the IPv4 network server, an IPv4 request message that is sent by the terminal according to the IPv4 address of the IPv4 network server, to complete the access to the IPv4 network server.

If the terminal does not support the IPv4 protocol stack, the allocating unit 300 is further configured to allocate the terminal a DNS address directing to the DNS64 server.

After a DNS address directing to the DNS64 server is allocated to the terminal that does not support the IPv4 protocol stack, if the terminal accesses an IPv4 network server supporting the IPv4 protocol stack only and sends an IPv6 address query request to the DNS server, the transceiving unit 100 is further configured to forward the IPv6 address query request to the DNS64 server, so that the DNS64 server returns an IPv6 address synthesized according to the IPv4 address of the IPv4 network server; and forward, to a network address translation server, an IPv6 request message that is sent by the terminal according to the synthesized IPv6 address, so that the network address translation server translates the IPv6 request message into an IPv4 request message and sends the IPv4 request message to the IPv4 network server, and also translates an IPv4 response message returned from the IPv4 network server into an IPv6 response message and sends the IPv6 response message to the terminal, to complete the access to the IPv4 network server.

Figure 6:
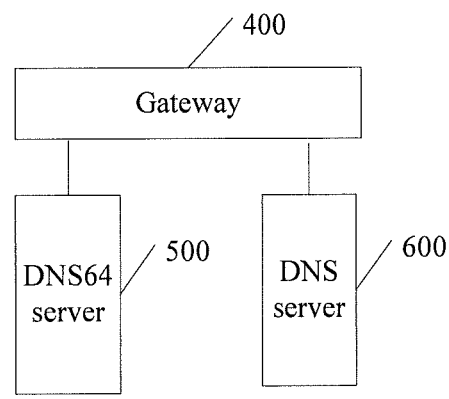
FIG. 6 is a schematic composition diagram of an address allocating system according to an embodiment of the present invention.
Figure 7:
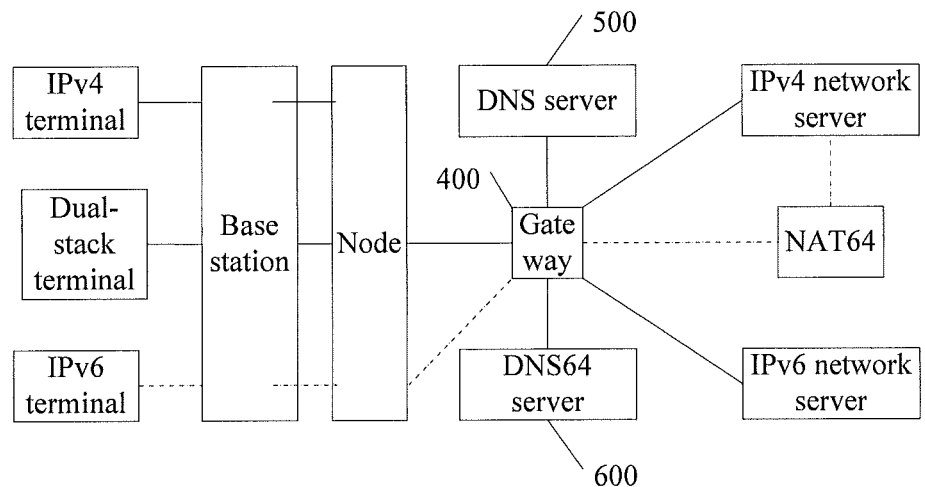
FIG. 7 is an application scenario diagram of an address allocating system according to FIG. 6.

Referring to FIG. 6 and FIG. 7, FIG. 6 is a schematic structure diagram of an address allocating system according to an embodiment of the present invention, and FIG. 7 is an application scenario diagram of the DNS address allocating system illustrated in FIG. 6. In this embodiment, the system includes the foregoing apparatus, a DNS server 500 and a DNS64 server 600, where the apparatus is a gateway 400.

The DNS server 500 is configured to connect to the apparatus, namely the gateway 400, and send an IPv4 address and/or an IPv6 address of a network server to a terminal.

The DNS64 server 600 is configured to connect to the apparatus, namely the gateway 400, and synthesize an IPv4 address of an IPv4 network server supporting the IPv4 protocol stack only into an IPv6 address and send the IPv6 address to the terminal.

With reference to FIG. 7, the following describes a typical procedure for a terminal to access a network server: a dual-stack terminal accesses an IPv4 network server.

A dual-stack terminal completes a packet data protocol (PDP) attach procedure with a base station and logs in to a packet switched (PS) domain, that is, logging in to a database of a node.

The dual-stack terminal initiates a PDP activation request to the node, where the PDP activation request includes a PDP type of the dual-stack terminal.

After selecting an appropriate access point on the gateway 400, the node initiates a create session request to the gateway 400, carrying the PDP type of the dual-stack terminal.

The gateway 400 creates, according to its capability and the PDP type that the node reports, an appropriate PDP bearer, and allocates, according to the PDP type, an IP address and an address of the DNS server 500 to the dual-stack terminal. In general, address allocation herein requires reference to the capability of the gateway itself, such as the gateway's capability of supporting a protocol stack. If the PDP type indicates that the terminal supports the IPv4 protocol stack, the terminal is allocated a DNS address directing to the DNS server. If the PDP type indicates that the terminal does not support the IPv4 protocol stack, the terminal is allocated a DNS address directing to the DNS64 server.

The gateway 400 sends the DNS address and the IP address to a node by responding to the session signaling.

The node sends information including the IP address and the DNS address to the dual-stack terminal.

The dual-stack terminal accesses an IPv4 network server and initiates a network server IPv4 address query request and a network server IPv6 address query request to the DNS server 500.

The DNS server 500 retrieves domain name data and responds to the address query requests by returning, through the gateway 400, a message that indicates an IPv4 address of the IPv4 network server and absence of an IPv6 address to the dual-stack terminal.

The dual-stack terminal obtains only the IPv4 address of the IPv4 network server, and uses the IPv4 address as a destination address and the IPv4 address of the dual-stack terminal as a source address to send an IPv4 request message to the gateway 400.

The gateway 400, according to routing configuration, forwards an IPv4 request message to the IPv4 network server and, at the same time, triggers a charging mechanism.

The IPv4 network server responds to the request of the dual-stack terminal by returning an IPv4 response message to the gateway 400, with a destination address being the IPv4 address of the dual-stack terminal.

The gateway 400 forwards the IPv4 response message of the IPv4 server to the dual-stack terminal, to complete the access.

In this procedure, various problems in the prior art, where a dual-stack terminal accesses an IPv4 network server through an NAT64 (as shown in the access path in FIG. 7), are avoided, and interworking between an IPv4 network and an IPv6 network is also implemented.

The node illustrated in FIG. 7 may be a serving GPRS support node (SGSN), and the gateway illustrated may be a gateway GPRS support node (GGSN) or a packet data network gateway (P-GW). The system can be widely used in networks, such as wideband code division multiple access (WCDMA) networks, time division-synchronous code division multiple access (TD-SCDMA) networks, code division multiple access (CDMA) networks, and long term evolution networks.

As described in the foregoing embodiments, the present invention has the following advantages:

Configuring both a DNS server and a DNS64 server for one access point of a gateway and allocating a terminal a DNS address directing to the DNS server or DNS64 server according to a protocol stack type supported by the terminal enrich allocation modes in the prior art. Moreover, a DNS address directing to the DNS server is allocated to a dual-stack terminal, so that the dual-stack terminal, when accessing an IPv4 network server, can always access the IPv4 network server directly by using the IPv4 protocol stack without the need of message translation by an NAT64, thereby reducing service loads of the NAT64 and lowering expansion costs of an operator. In addition, the access delay is decreased and access reliability is improved to avoid problems, for example, that an NAT64 supports only a few network protocols and cannot decrypt application layer data due to a defective application layer gateway.

A person of ordinary skill in the art can understand that all or a part of the processes of the methods in the foregoing embodiments may be implemented by a computer program instructing relevant hardware. The program may be stored in a computer readable storage medium. When the program runs, the processes of the foregoing methods in the embodiments are performed. The storage medium may be a magnetic disk, an optical disc, a read-only memory (ROM), or a random access memory (RAM).

The foregoing discloses merely some exemplary embodiments of the present invention, and the scope of the claims of the present invention shall not be limited thereto. Therefore, any equivalent variation made based on the claims of the present invention shall fall within the scope of the present invention.

What is claimed is:

1. An address allocating method, comprising:
configuring a domain name system (DNS) server and an internet protocol version 6 (IPv6) and internet protocol version 4 (IPv4) domain name system (DNS64) server for one access point of a gateway;
determining whether a terminal requesting access to a network server supports the IPv4 protocol stack; and
if the terminal supports the IPv4 protocol stack, allocating the terminal a DNS address directing to the DNS server;
wherein, the DNS server is for sending an IPv4 address and/or an IPv6 address of the network server to the terminal, and the DNS64 server is for synthesizing an IPv4 address of an IPv4 network server supporting the IPv4 protocol stack only into an IPv6 address and send the IPv6 address to the terminal, wherein the allocating the terminal a DNS address directing to the DNS server if the terminal supports the IPv4 protocol stack comprises:
if the terminal supports both the IPv4 protocol stack and the IPv6 protocol stack, allocating the terminal a DNS address directing to the DNS server.

2. The method according to claim 1, wherein if the terminal supports both the IPv4 protocol stack and the IPv6 protocol stack, the allocating the terminal a DNS address directing to the DNS server further comprises:
if the terminal accesses an IPv4 network server supporting the IPv4 protocol stack only and sends an IPv4 address query request and an IPv6 address query request to the DNS server, forwarding the IPv4 address query request and the IPv6 address query request to the DNS server, so that the DNS server returns a message that indicates an IPv4 address of the IPv4 network server and absence of an IPv6 address of the IPv4 network server; and
forwarding, to the IPv4 network server, an IPv4 request message that is sent by the terminal according to the IPv4 address of the IPv4 network server, to complete the access to the IPv4 network server.

3. The method according to claim 1, further comprising:
if the terminal does not support the IPv4 protocol stack, allocating the terminal a DNS address directing to the DNS64 server.

4. The method according to claim 3, wherein the allocating the terminal a DNS address directing to the DNS64 server if the terminal does not support the IPv4 protocol stack comprises:
if the terminal accesses an IPv4 network server supporting the IPv4 protocol stack only and sends an IPv6 address query request to the DNS server, forwarding the IPv6 address query request to the DNS64 server, so that the DNS64 server returns an IPv6 address synthesized according to the IPv4 address of the IPv4 network server; and
forwarding, to a network address translation server, an IPv6 request message that is sent by the terminal according to the synthesized IPv6 address, so that the network address translation server translates the IPv6 request message into an IPv4 request message and sends the IPv4 request message to the IPv4 network server, and also translates an IPv4 response message returned from the IPv4 network server into an IPv6 response message and sends the IPv6 response message to the terminal, to complete the access to the IPv4 network server.

5. The address allocating method according to claim 1, wherein the allocating the terminal a DNS address directing to the DNS server if the terminal supports the IPv4 protocol stack further comprises:
if the terminal supports the IPv4 protocol stack only, allocating the terminal a DNS address directing to the DNS server.

6. An address allocating apparatus, comprising:
a memory storing instructions; and
computer hardware in communication with the memory and executing the instructions to:
perform information interaction with a domain name system (DNS) server and an internet protocol version 6 (IPv6) and internet protocol version 4 (IPv4) domain name system (DNS64) server that are both configured on one access point;
determine whether a terminal requesting access to a network server supports the IPv4 protocol stack; and
if a terminal accessing the network server supports the IPv4 protocol stack, allocate the terminal a DNS address directing to the DNS server;
wherein, the DNS server is for sending an IPv4 address and/or an IPv6 address of the network server to the terminal, and the DNS64 server is for synthesizing an IPv4 address of an IPv4 network server supporting the IPv4 protocol stack only into an IPv6 address and send the IPv6 address to the terminal,
if the terminal supports both the IPv4 protocol stack and the IPv6 protocol stack, computer hardware allocates the terminal a DNS address directing to the DNS server.

7. The apparatus according to claim 6, wherein after a DNS address directing to the DNS server is allocated to the terminal that supports both the IPv4 protocol stack and the IPv6 protocol stack, if the terminal accesses an IPv4 network server supporting the IPv4 protocol stack only and sends an IPv4 address query request and an IPv6 address query request to the DNS server, the forwards the IPv4 address query request and the IPv6 address query request to the DNS server, so that the DNS server returns a message that indicates an IPv4 address of the IPv4 network server and absence of an IPv6 address of the IPv4 network server; and
forwards, to the IPv4 network server, an IPv4 request message that is sent by the terminal according to the IPv4 address of the IPv4 network server, to complete the access to the IPv4 network server.

8. The apparatus according to claim 6, wherein if the terminal does not support the IPv4 protocol stack, the computer hardware is further configured to allocate the terminal a DNS address directing to the DNS64 server.

9. The apparatus according to claim 8, wherein after a DNS address directing to the DNS64 server is allocated to the terminal that does not support the IPv4 protocol stack, if the terminal accesses an IPv4 network server supporting the IPv4 protocol stack only and sends an IPv6 address query request to the DNS server, the computer hardware:
forwards the IPv6 address query request to the DNS64 server, so that the DNS64 server returns an IPv6 address synthesized according to the IPv4 address of the IPv4 network server; and
forwards, to a network address translation server, an IPv6 request message that is sent by the terminal according to the synthesized IPv6 address, so that the network address translation server translates the IPv6 request message into an IPv4 request message and sends the IPv4 request message to the IPv4 network server, and also translates an IPv4 response message returned from the IPv4 network server into an IPv6 response message and sends the IPv6 response message to the terminal, to complete the access to the IPv4 network server.

10. The address allocating apparatus according to claim 6, wherein if the terminal supports the IPv4 protocol stack only, the computer hardware allocates the terminal a DNS address directing to the DNS server.

11. An address allocating apparatus, comprising:
a memory to store a program; and
a processor to execute the program to:
configure both a domain name system (DNS) server and an internet protocol version 6 (IPv6) and internet protocol version 4 (IPv4) domain name system (DNS64) server for one access point of a gateway; and
determine whether a terminal requesting access to a network server supports the IPv4 protocol stack; and
if the terminal supports the IPv4 protocol stack, allocate the terminal a DNS address directing to the DNS server,
wherein, the DNS server is for sending an IPv4 address and/or an IPv6 address of the network server to the terminal, and the DNS64 server is for synthesizing an IPv4 address of an IPv4 network server supporting the IPv4 protocol stack only into an IPv6 address and send the IPv6 address to the terminal,
if the terminal supports both the IPv4 protocol stack and the IPv6 protocol stack, the processor allocates the terminal a DNS address directing to the DNS server.

12. The apparatus according to claim 11, if the terminal accesses an IPv4 network server supporting the IPv4 protocol stack only and sends an IPv4 address query request and an IPv6 address query request to the DNS server, the processor:

forwards the IPv4 address query request and the IPv6 address query request to the DNS server, so that the DNS server returns a message that indicates an IPv4 address of the IPv4 network server and absence of an IPv6 address of the IPv4 network server; and
forwards, to the IPv4 network server, an IPv4 request message that is sent by the terminal according to the IPv4 address of the IPv4 network server, to complete the access to the IPv4 network server.

13. The apparatus according to claim 11, if the terminal does not support the IPv4 protocol stack, the processor is further configured to allocate the terminal a DNS address directing to the DNS64 server.

14. The apparatus according to claim 13, if the terminal accesses an IPv4 network server supporting the IPv4 protocol stack only and sends an IPv6 address query request to the DNS server, the processor:
forwards the IPv6 address query request to the DNS64 server, so that the DNS64 server returns an IPv6 address synthesized according to the IPv4 address of the IPv4 network server; and
forwards, to a network address translation server, an IPv6 request message that is sent by the terminal according to the synthesized IPv6 address, so that the network address translation server translates the IPv6 request message into an IPv4 request message and sends the IPv4 request message to the IPv4 network server, and also translates an IPv4 response message returned from the IPv4 network server into an IPv6 response message and sends the IPv6 response message to the terminal, to complete the access to the IPv4 network server.

15. The address allocating apparatus according to claim 11, wherein if the terminal supports the IPv4 protocol stack only, the processor allocates the terminal a DNS address directing to the DNS server.

* * * * *